Patented Aug. 17, 1937

2,090,596

UNITED STATES PATENT OFFICE 2,090,596

NITROGENOUS COMPOUNDS

Ralph A. Jacobson, Wilmington, Del., assignor to E. I. du Pont de Nemours & Company, Wilmington, Del., a corporation of Delaware No Drawing. Application January 24, 1936, Serial No. 60,739

23 Claims. (Cl. 260—2)

This invention relates to certain new chemical compounds and methods for their preparation. It relates more particularly to certain acylated amides, and still more particularly to carboxylic acid amides in which at least one amido-hydrogen has been replaced by the acyl radical of an alpha-methylene monocarboxylic acid.

It is an object of the invention to produce new and useful compounds of the above type. A further object is to produce substituted carboxylic acid amides in which one or more amido-hydrogen atoms are replaced by radicals of the formula

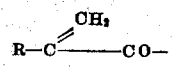

(derived from acids of the formula

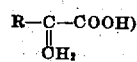

in which R is hydrogen or a monovalent hydrocarbon radical. A further object is the production of polymers and interpolymers of these substituted amides. A still further object is to produce new and improved substances which are useful in the coating, sizing, impregnating and molding arts. A more specific object is to produce new and improved monomeric and polymeric alpha-methacrylyl amides. A still more specific object is to produce methacrylyl urea and polymers and interpolymers therefrom. An additional object is the provision of a new and improved process for producing substances of the type above described. Other objects will appear hereinafter.

In accomplishing these objects according to the present invention, it has been found that new and useful condensation products may be obtained by reacting together an ester of an alpha-methylene monocarboxylic acid and an alkali metal carboxylic acid amide. By "alkali metal carboxylic acid amide" is meant a carboxylic acid amide in which one or more amido-hydrogen atoms are replaced by an alkali metal such as sodium, potassium, lithium, or the like. Urea is considered to be the amide of a carboxylic acid (carbonic).

In practising the invention, the condensation may be carried out by reacting the ester of the alpha-methylene monocarboxylic acid with the preformed alkali metal carboxylic acid amide in the presence of a suitable catalyst such as, for example, acetone. Alternatively, the alkali metal carboxylic acid amide may be formed in situ in liquid ammonia in the presence of the ester of the alpha-methylene monocarboxylic acid; in this case, satisfactory results are obtained, as a rule, without the use of a catalyst.

The invention will be further illustrated, but is not limited, by the following examples in which the quantities, unless otherwise indicated, are stated in parts by weight.

EXAMPLE I

Methacrylyl formamide

To a solution of 100 parts of methyl alpha-methacrylate and 45 parts of formamide in about 623 parts of liquid ammonia were added 23 parts of metallic sodium. The mixture was allowed to stand overnight, water added, and the aqueous solution acidified with hydrochloric acid. The resulting solution was extracted several times with ether, the ether extract separated, the ether distilled off, and the residue fractionally distilled under vacuum. The product obtained was a white solid whose nitrogen content corresponded satisfactorily with that calculated for mono-alpha-methacrylyl formamide, which may be represented by the formula

$HCONHCOC(CH_3)=CH_2$.

EXAMPLE II

Methacrylyl urea

The synthesis of alpha-methacrylyl urea was carried out in the cold in a vessel equipped with a stirrer driven by a fairly powerful motor. A five-liter flask was surrounded by an ice bath and a mixture of 2400 grams (24 moles) of methyl alpha-methacrylate, 656 grams (8 moles) of sodium urea, $NH_2CONHNa$, (prepared, in accordance with the method given in my application Serial No. 15,425 filed April 9, 1935, by the action of one equivalent of metallic sodium upon one equivalent of urea in liquid ammonia), and 600 cc. of acetone was vigorously stirred therein at 8°–12° C. for three hours. The mixture thickened considerably and acquired a yellow color. The flask was immediately packed in a freezing mixture and 1520 cc. of 18% hydrochloric acid were added to the stirred mixture at such a rate as not to raise the temperature above 25° C. The slightly acid mixture was cooled to 2° C., with stirring, and the methacrylyl urea separated by suction filtration. The upper oily layer in the filtrate weighed 1980 grams and contained most of the excess methyl methacrylate. The methacrylyl urea was washed with several small portions of alcohol and recrystallized from 1300 cc. of alcohol. After cooling to 0° C., the alcoholic solution yielded 343 grams of pure white crystalline methacrylyl urea melting at 132°–134° C. Evaporation of the alcoholic mother liquor under reduced pressure gave an additional 41 grams, making a total yield of 37.5%. Upon analysis, the compound was found to contain 21.39% nitrogen, the calculated amount for methacrylyl urea being 21.87% nitrogen. Methacrylyl urea may be represented by the formula

NH$_2$CONHCOC(CH$_3$)=CH$_2$

The following procedure illustrates the preparation of methacrylyl urea by forming the sodium urea in situ in liquid ammonia in the presence of the ester. Suitable condensation in this case is obtained without the use of a catalyst. To a solution of 200 parts of methyl alpha-methacrylate and 100 parts of urea in about 623 parts of liquid ammonia were added, over a period of three hours, 48 parts of metallic sodium. The mixture was allowed to stand for a few hours at about 15° C., during which time practically all of the ammonia evaporated off. The residue in the flask was taken up with a small amount of water, the clear solution acidified at about 25° C. with hydrochloric acid, cooled, and the precipitate filtered. The product was purified by crystallization from hot water and found to be identical with the mono-alpha-methacrylyl urea prepared above.

Methacrylyl urea prepared as described by either of the above methods, polymerizes readily upon heating, alone or in the presence of polymerization catalysts, e. g., benzoyl peroxide. The following example is a more exact illustration of how this polymerization may be carried out.

EXAMPLE III

Polymeric methacrylyl urea

Ten (10) parts of the monomeric alpha-methacrylyl urea prepared as in Example II were dissolved in about 80 parts of ethyl alcohol containing 1 part of benzoyl peroxide, the solution placed in a flask fitted with a stirrer and reflux condenser, and heated to reflux. Polymer separated out of solution as fast as formed, and when the polymerization was complete, the polymer was filtered and dried. The product obtained was a white thermoplastic solid useful in the molding arts.

EXAMPLE IV

Methacrylyl phenyl urea

To a solution of 25 parts of methyl alpha-methacrylate in about 24 parts of acetone were added slowly, with stirring, 15.8 parts of sodium phenyl urea, C$_6$H$_5$N(Na)CONH$_2$ (prepared by the action of one equivalent of metallic sodium upon one equivalent of phenyl urea in liquid ammonia). The mixture was allowed to stand overnight, a small amount of water added, and the solution filtered. The product was purified by crystallization from alcohol. The purified material melted at 130°–131° C., and upon analysis had the correct nitrogen content for methacrylyl phenyl urea, which may be represented by the formula

NH$_2$CON(C$_6$H$_5$)COC(CH$_3$)=CH$_2$

Alpha-methacrylyl phenyl urea may also be prepared without the intermediate step of separating the sodium phenyl urea, as follows. To a solution of 45 parts of phenyl urea in about 623 parts of liquid ammonia were added 7.6 parts of metallic sodium. To this solution was then added 45 parts of methyl methacrylate in 20 parts of acetone, the mixture allowed to stand overnight, water added, and the precipitate filtered. The product obtained after crystallization from alcohol melted at 130° C. to 131° C., and contained 14.09% nitrogen whereas the calculated nitrogen content of methacrylyl phenyl urea is 13.74%.

Methacrylyl phenyl urea polymerizes to a white thermoplastic solid when heated, alone or in the presence of polymerization catalysts, as is illustrated by the following example.

EXAMPLE V

Polymeric methacrylyl phenyl urea

Ten (10) parts of monomeric alpha-methacrylyl phenyl urea, prepared as in Example IV, was dissolved in 60 parts of ethyl alcohol. This solution was refluxed for four hours with 1 part of benzoyl peroxide. The solution became cloudy almost at once, and a white solid gradually separated during the refluxing. Upon filtering the hot solution, polymeric methacrylyl phenyl urea was obtained. This polymer was infusible below 200° C., but could be molded at high temperatures.

The present acylated carboxylic acid amides, and especially the monomeric alpha-alkacrylyl ureas, can be interpolymerized readily with other monomeric polymerizable substances. Especially valuable interpolymers are obtained from methyl alpha-methacrylate and alpha-methacrylyl urea. These interpolymers vary in their solubility characteristics from those which are soluble in the common organic solvents to those which are soluble only in dilute alkali, depending upon the proportion of methyl alpha-methacrylate used. Interpolymers prepared from 80% alpha-methacrylyl urea and 20% methyl alpha-methacrylate are insoluble in the common organic solvents but are soluble in dilute sodium hydroxide, and can be regenerated by treatment of such solutions with acids. Films of these interpolymers prepared by regeneration from alkali solutions are clear and transparent but without plasticizers are somewhat brittle. Interpolymers prepared from 80–90% of methyl alpha-methacrylate and 20–10% alpha-methacrylyl urea are soluble in the common organic solvents such as acetone, benzene, and the like, and films prepared from such solutions are clear, tough and transparent.

These features of the invention are illustrated by the following examples:

EXAMPLE VI

Interpolymerization of methacrylyl urea and methyl methacrylate

Eighteen (18) parts of methyl alpha-methacrylate, 2 parts of alpha-methacrylyl urea and 0.2 part of benzoyl peroxide were dissolved in 180 parts of a 1:1 water-methanol mixture (by volume). The solids content of the solution was thus 10% methacrylyl urea and 90% methyl methacrylate. Upon heating the solution at 65° C. for twenty hours, a pasty mixture was obtained. The solvent was pressed out, the powdery polymer was washed thoroughly with warm 50% aqueous methanol, and dried in air. The yield of polymer was 18.5 parts. The polymer was soluble in ethylene glycol monomethyl ether. A 5% solution of polymer in ethylene glycol monomethyl ether was very viscous. The polymer was molded at 180° C. to a clear, colorless, tough chip, resembling similar molded products of unmodified methyl methacrylate. The softening point of the chip was 135° C., compared with 120°–125° C. for similar chips of unmodified methyl methacrylate. The chip was unaffected by immersion in boiling water for five minutes.

The following table gives the compositions and solubilities of several methyl alpha-methacrylate/alpha-methacrylyl urea interpolymers prepared substantially as outlined in Example VI.

| Methyl methacrylate | Methacrylyl urea | % Benzoyl peroxide | Solvent used | Solubility of interpolymer |
|---|---|---|---|---|
| 90% | 10% | 2.0 | Dioxane | Sol. dioxane, ethyl acetate, aromatic hydrocarbons; compatible with nitrocellulose. |
| 80 | 20 | 1.0 | 50% aqueous methanol | Insol. butyl acetate, dioxane; sol. in ethylene glycol monomethyl ether; insol. aqueous alkali. |
| 50 | 50 | 0.5 | ---do---- | Insol. organic solvents and in aqueous alkali. |
| 40 | 60 | 0.5 | ---do---- | Partially sol. 6% aqueous alkali; insol. in organic solvents. |
| 30 | 70 | 0.5 | ---do---- | Do. |
| 20 | 80 | 0.5 | ---do---- | Sol. in 5% aqueous alkali; insol. in organic solvents. |
| 20 | 80 | 0.1 | ---do---- | Do. |

Interpolymers can be prepared by dissolving the monomeric alpha-alkacrylyl amides and other polymerizable substances in organic liquids which are solvents for both the polymers and the monomeric polymerizable substances, as illustrated in the following example.

Example VII

*Interpolymerization of methacrylyl urea and cyclohexyl methacrylate*

Four (4) parts of monomeric mono-alpha-methacrylyl urea, 36 parts of cyclohexyl alpha-methacrylate and 0.8 part of benzoyl peroxide were dissolved in 160 parts of dioxane. The solution was heated at 65° C. for sixty-four hours. The product was a viscous, clear liquid, which could be blended with solutions of nitrocellulose and from which a solid interpolymer could be obtained by evaporation of the solvent. The solid interpolymer could be dissolved in organic solvents such as dioxane, ethyl acetate, aromatic hydrocarbons and acetone, and was compatible with drying oils.

By increasing the ratio of methacrylyl urea to cyclohexyl methacrylate to 0.2 to 1 in the above example, an interpolymer was obtained which was still compatible with drying oils.

Interpolymerization of relatively small amounts of alpha-methacrylyl urea with certain polymerizable materials, the polymers of which are soluble in (compatible with) drying oils to only a limited extent, can be used as a means for making interpolymers which are more compatible with such oils. This is illustrated as follows:

Example VIII

*Interpolymerization of methacrylyl urea and n-propyl methacrylate*

Two hundred (200) parts of a 10% solution of methacrylyl urea in dioxane (i. e., 20 parts of methacrylyl urea and 180 parts of dioxane), 180 parts of n-propyl alpha-methacrylate and 4 parts of benzoyl peroxide were dissolved in 620 parts of dioxane. The solution was filtered to remove traces of haze. The clear solution was then heated on a steam bath until the temperature was approximately 100° C. and was heated at 100° C. for approximately eighteen hours. The product was a clear, somewhat viscous liquid from which hard films could be obtained. The polymer was compatible with drying oils and oil-modified polyhydric alcohol-polybasic acid resins. The corresponding unmodified propyl methacrylate polymer was considerably less compatible with drying oils.

The procedure of this example was repeated using isobutyl methacrylate instead of propyl methacrylate. Similar results were obtained.

Example IX

*Interpolymerization of methacrylyl urea and methyl acrylate*

One (1) part of alpha-methacrylyl urea, 9 parts of methyl acrylate and 0.1 part of benzoyl peroxide were dissolved in 20 parts of dioxane. The solution was heated at 65° C. for approximately twenty hours. The product was a viscous, almost jelly-like liquid.

Example X

*Interpolymerization of methacrylyl urea and vinyl acetate*

An emulsion of 27 parts of vinyl acetate and 3 parts of alpha-methacrylyl urea in 120 parts of hot water, to which was added 0.3 part of benzoyl peroxide, was refluxed with stirring. After fifteen minutes, a white, solid interpolymer began to precipitate, and after five hours' heating the interpolymer had formed lumps which could no longer be stirred. These lumps of solid interpolymer were separated from the liquid and dried in vacuo. The opaque interpolymer softened only slightly at 100° C., whereas unmodified vinyl acetate polymer softens at 45°–50° C.

Example XI

*Interpolymerization of methacrylyl urea and methyl vinyl ketone*

A filtered solution of one part of alpha-methacrylyl urea in 18 parts of methyl vinyl ketone exposed at 29°–30° C. to strong ultraviolet light for sixteen hours was found to have set to a tough gel. After 136 hours' exposure to ultraviolet light, the interpolymer was homogeneous and softened at 43°–44° C., as compared with 34° C. for pure methyl vinyl ketone polymer. The interpolymer was insoluble in acetone and in 5% aqueous sodium hydroxide solution.

When alpha-methacrylyl urea is used in proportions greater than those in which it is soluble in methyl vinyl ketone, interpolymers result which are not entirely homogeneous. However, when alpha-methacrylyl urea and methyl vinyl ketone are interpolymerized in the presence of a mutual solvent such as ethanol or dioxane, interpolymers can be obtained containing any desired proportion of the two ingredients. Such interpolymers are soluble in solvents such as ethanol, dioxane, ethyl acetate, and benzene-alcohol mixtures, and clear, hard films are deposited from solutions in these solvents by baking at about 100° C. These interpolymers may also be readily molded.

Example XII

*Interpolymerization of methacrylyl phenyl urea and methyl methacrylate*

A solution of 10 parts of alpha-methacrylyl phenyl urea, 5 parts of methyl alpha-methacrylate and 0.5 part of benzoyl peroxide in 40 parts of alcohol was gently refluxed for four hours. The interpolymer separated during the heating period and was separated by filtration of the suspension.

The interpolymers which are soluble in dilute caustic solutions, such as the interpolymer prepared from 80–90% of alpha-methacrylyl urea and 20–10% of methyl alpha-methacrylate, can be regenerated from the alkali solution v treatment with dilute acids. For example, ..ms can be prepared from the alkali solutions by brushing, flowing or spraying on glass, metals, etc., and immersing for a few minutes in dilute solutions (e. g., 5%) of acids such as hydrochloric, sulfuric or acetic.

The invention is applicable generally to the preparation of carboxylic acid amides in which at least one amido-hydrogen is replaced by the acyl radical of an alpha-methylene monocarboxylic acid, polymers thereof, and interpolymers thereof. As further examples of esters which may be used in the process, there may be mentioned propyl alpha-methacrylate, n-butyl alpha-methacrylate, isobutyl alpha-methacrylate, amyl alpha-methacrylate, hexyl alpha-methacrylate, lauryl alpha-methacrylate, beta-ethoxy-ethyl alpha-methacrylate, octadecyl alpha-methacrylate, 9:10-octadecenyl alpha-methacrylate, alpha-methacrylates obtained from the alcohols which are by-products in the methanol synthesis, methyl alpha-ethyl-acrylate, butyl alpha-ethyl-acrylate, ethyl alpha-butylacrylate, amyl alpha-butylacrylate, methyl alpha-hexylacrylate, butyl alpha-dodecylacrylate, methyl acrylate, ethyl acrylate, methyl alpha-phenylarcrylate, and homologues thereof.

As further examples of alkali metal carboxylic acid amides which may be reacted with the above esters, there may be mentioned sodium hexanoamide, sodium lauramide, sodium, oleamide, sodium benzamide, sodium stearamide, the sodium amides of fatty oil acids, and the corresponding potassium amides.

In the reaction between the ester of the alpha-methylene monocarboxylic acid and the alkali metal carboxylic acid amide, the use of acetone as a catalyst has given especially desirable results, but any catalyst which functions similarly in promoting the condensation may be used. In general, the lower saturated aliphatic alcohols and ketones are preferred, such as, for example, isopropyl alcohol, n-butyl alcohol, isobutyl alcohol, amyl alcohol, acetone, methyl propyl ketone, dibutyl ketone, ethyl propyl ketone, and homologues thereof. The catalyst may act as a solvent for one or more of the reactants or other substances may be used as solvents, if desired, such as, for example, benzene, toluene and hydrocarbon solvents.

The proportions of the various reactants may vary according to their nature and according to the products desired. Thus, in order to produce mono-acylated amides (i. e., substituted amides having, for example, only one alpha-methacrylyl radical), it is preferable to react together substantially chemically equivalent proportions of the alpha-alkyl acrylic acid ester and the mono-alkali metal carboxylic acid amide. To produce poly-acylated amides, two or more molecular proportions of the alpha-alkyl acrylic acid ester should be reacted with one molecular proportion of a polyalkali metal carboxylic acid amide, but it is usually preferable to proceed by the following steps: (a) produce the mono-acylated amide by reaction of one molecular proportion of the alpha-alkyl acrylic acid ester with one molecular proportion of a monoalkali metal derivative of a carboxylic acid amide having a plurality of hydrogen atoms replaceable by an alkali metal (which hydrogen atoms may be attached to the same nitrogen atom or to different nitrogen atoms); (b) convert the resultant mono-acylated amide to its alkali metal derivative, for instance, by reaction with metallic sodium in liquid ammonia; and (c) react the product obtained by step (b) with a further molecular proportion of the alpha-alkyl acrylic acid ester. It will be apparent that a large number of variations are possible, depending upon the reactants chosen and the products desired, all of which variations are within the general principles of the process described.

The temperatures and pressures employed are subject to some variation, depending upon the nature of the reactants. For example, temperatures within the range of $-40°$ C. to $200°$ C. have been employed. Higher or lower temperatures may, in some instances, be used. Usually, the lowest temperatures at which the reaction proceeds to a practical extent are preferred and, in any event, it is preferable to employ temperatures at which no substantial decomposition of the reactants and/or products occurs. The pressures may be sub-atmospheric, atmospheric, or super-atmospheric (i. e., below, at or above 760 mm.).

As indicated from certain of the examples, products highly useful in the coating, molding and sizing arts may be obtained by polymerizing the herein described acylated amides, either per se or in the presence of other polymerizable substances. Polymerization catalysts such as organic peroxides, peracids, and per-salts are preferred, but optional in both instances. Ultra-violet light also accelerates polymerization. Particularly valuable products are obtained by carrying out the polymerization of the acylated amides in the presence of such polymerizable materials as the following: acrylic and methacrylic acids, their amides, anhydrides, nitriles, and in particular their esters; methyl isopropenyl ketone and other ketones containing the group

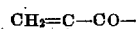

butadiene, chlorobutadiene, and isoprene; itaconic and fumaric acids, their esters, amides, and nitriles; vinyl compounds such as styrene, vinyl acetate, vinyl chloracetate, and vinyl chloride; and drying and semi-drying fatty oils. The acylated amides may also be polymerized in the presence of synthetic resins such as polyhydric alcohol-polycarboxylic acid resins and phenol-aldehyde resins; hydrogenated synthetic resins such as hydrogenated phenol-aldehyde resins and hydrogenated natural resin-modified phenol-aldehyde resins; and cellulose derivatives such as cellulose ethers and esters.

As indicated from Example VI and the table immediately thereafter, interpolymers of alpha-methacrylyl urea and other polymerizable bodies are an especially valuable class. Among other compounds which may be advantageously inter-polymerized with alpha-methacrylyl urea may be mentioned particularly the monomeric alkyl esters of alpha-ethylacrylic acid and alpha-butyl-acrylic acid, e. g., ethyl alpha-ethylacrylate (B. P. $136°$ C.), methyl alpha-ethylacrylate (B. P. $122°$ C.), and methyl alpha-butylacrylate (B. P. $161°$ C.). These monomeric esters may be prepared by reacting the appropriate alkyl half ester of ethyl or butyl malonic acid with formaldehyde and diethylamine. Their polymers are soft, resinous materials. By interpolymerizing monomeric methyl alpha-ethylacrylate, for example, with methacrylyl urea, resinous materials may be obtained which are distinctly harder and more useful than are the polymers of methyl alpha-ethylacrylate alone.

As will be clear from the examples, the polymerization of the herein described acylated amides, such as alpha-methacrylyl urea, in the presence of other polymerizable substances can be carried out either in the presence or absence of liquid reaction media. Examples of suitable solvents are the water-methanol mixtures of certain of the examples, or similar mixtures of water and ethanol or propanol; alcohols alone, such as methanol, ethanol, propanol, and normally liquid homologues thereof; ester-type solvents, such as ethyl acetate, butyl acetate and glycol diacetate; aromatic hydrocarbons, such as benzene, toluene, xylene; acetone, and other normally liquid aliphatic ketones.

Interpolymers of the present acylated amides with other polymerizable substances, particularly methacrylyl urea-methacrylic acid ester interpolymers, can also be prepared by conducting the polymerization in an aqueous medium, the mixture of monomers being dispersed or emulsified in a relatively large amount of water containing a small amount (about 2% of the weight of the mixture) of a suitable "granulating" or emulsifying agent such as polymethacrylic acid or its salts, polymethacrylamide, polymethacrylimide, glycol cellulose, methyl starch, diethylaminoethyl alpha-methacrylate polymer, and interpolymers of methacrylic acid with esters of acids of the acrylic series. It is merely necessary to add the mixture to be polymerized, with vigorous stirring, to about four times its weight of water containing the granulating agent, heat to a temperature of about 80° C., and reflux for about an hour. The interpolymer separates in the form of granules which are especially well adapted for washing to remove impurities.

As illustrated by the examples, the proportions of polymerizable substances which can be used in the polymerizable mixtures in accordance with this invention may vary within relatively wide limits and depend to a large extent upon the properties desired in the final products.

The temperatures at which the polymerization of the mixture may be conducted may vary within relatively wide limits depending upon a number of factors, such as, for example, the kind and amount of polymerization catalyst employed, upon the desired properties of the products (as, for instance, whether bubble-free solid polymer masses are desired), upon the volatility of the polymerizable substances, and upon related factors. While interpolymerization will occur slowly even at ordinary room temperatures and in the absence of polymerization catalysts, it is generally preferable to use somewhat higher temperatures, e. g., 40°-80° C. and, in some instances, up to 100° C. The interpolymerization may be effected, if desired, by exposing the monomeric materials to the action of ultraviolet light instead of heat. If desired, a combination of heat and ultraviolet light treatment may be used to effect interpolymerization.

The monomeric products of this invention, either per se or combined with plasticizers, solvents, resins, waxes, pigments, dyes or polymerized materials of the type herein described, are highly useful in the coating, sizing and impregnating arts.

The polymeric products of the invention, either alone or modified with other materials, are highly useful in the coating, sizing, impregnating and molding arts. Certain of the alpha-methacrylyl urea/methyl alpha-methacrylate interpolymers have been found useful as dispersing agents for pigments in water, adhesives for making wood to wood seals, and as emulsifying agents for China-wood oil and paraffin. In view of the alkali-solubility of interpolymers prepared from high percentages of alpha-methacrylyl urea, these products are highly valuable as modifying agents for rayon and for clear, sheeted, regenerated cellulose; as ingredients of water-paints and distempers; as pigment binders, and as sizing agents for paper, cloth and similar materials. On the other hand, interpolymers containing high percentages of methyl alpha-methacrylate and low percentages of alpha-methacrylyl urea are highly valuable in all types of coating compositions, such as paints, varnishes, lacquers and enamels. In such coating compositions, they may be used alone or modified with other resins (either natural or synthetic), waxes, cellulose derivatives, plasticizers or softeners, fillers, pigments and/or dyes.

The invention is particularly advantageous in that it provides simple and relatively inexpensive means of preparing new materials, particularly resinous materials, of widely varying properties. It furthermore affords a simple means for converting low-softening resins to more useful higher-softening modifications. It provides a means of preparing modified methacrylic resins which have higher softening points and better oil-solubility than the unmodified resins. The invention similarly affords a means of preparing high-softening resins from other polymerizable substances, the unmodified polymers of which have softening points too low for many purposes. Further, the invention permits a ready method for the preparation of interpolymers from methyl alpha-methacrylate and alpha-methacrylyl urea varying in their solubility characteristics from those which are soluble in the common organic solvents to those which are soluble only in dilute aqueous alkali, as well as those which are essentially insoluble in both types of solvents, depending upon the proportions of alpha-methacrylyl urea and methyl alpha-methacrylate employed.

The preparation of acyl ureas broadly by the reaction of esters with alkali metal ureas is claimed in my copending application Serial No. 60,706 filed of even date herewith.

As many apparently widely different embodiments of this invention may be made without departing from the spirit and scope thereof, it is to be understood that I do not limit myself to the specific embodiments thereof except as defined in the appended claims.

I claim:

1. The process which comprises reacting an ester of a monomeric alpha-methylene monocarboxylic acid with an alkali metal carboxylic acid amide.

2. The process which comprises reacting an ester of a monomeric alpha-methylene monocarboxylic acid with an alkali metal carboxylic acid amide in the presence of a condensation catalyst.

3. The process which comprises reacting an ester of a monomeric alpha-methylene monocarboxylic acid with an alkali metal carboxylic acid amide in the presence of acetone.

4. In the process of reacting an ester of a monomeric alpha-methylene monocarboxylic acid with an alkali metal carboxylic acid amide, the step which comprises forming the alkali metal carboxylic acid amide in situ in liquid ammonia in the presence of the alpha-methylene monocarboxylic acid ester.

5. The process of producing a monemeric alpha-methacrylyl urea which comprises reacting an ester of monomeric alpha-methyl acrylic acid with a sodium urea.

6. The process of producing an alpha-methacrylyl urea which comprises reacting an ester of monomeric alpha-methyl acrylic acid with a sodium urea in the presence of a catalyst from the class consisting of lower saturated aliphatic alcohols and ketones.

7. The process of producing an alpha-methacrylyl urea which comprises reacting an ester of monomeric alpha-methyl acrylic acid with a sodium urea in the presence of acetone.

8. The process of producing an alpha-methacrylyl urea which comprises reacting monomeric methyl alpha-methacrylate with a sodium urea in the presence of acetone.

9. In a process of producing compounds having therein the acyl radical of an alpha-methylene monocarboxylic acid, the steps which comprise reacting an ester of a monomeric alpha-methylene monocarboxylic acid with an alkali metal carboxylic acid amide, and polymerizing the resultant product.

10. In a process of producing polymerized alpha-methacrylyl urea, the step which comprises heating monomeric alpha-methacrylyl urea.

11. In a process of producing polymerized alpha-methacrylyl urea, the step which comprises heating monomeric alpha-methacrylyl urea with a small amount of benzoyl peroxide in ethyl alcohol.

12. A monomeric carboxylic acid amide in which at least one amido-hydrogen atom has been replaced by the acyl radical of an alpha-methylene monocarboxylic acid of the formula $$R-\underset{\underset{CH_2}{\|}}{C}-COOH$$

where R is hydrogen or a monovalent hydrocarbon radical.

13. A monomeric substituted urea in which at least one hydrogen atom is replaced by the acyl radical of an alpha-methylene monocarboxylic acid.

14. An alpha-methacrylyl urea.

15. An alpha-methacrylyl phenylurea.

16. Polymers obtainable by the polymerization of the products set forth in claim 12.

17. Polymers obtainable by the polymerization of the products set forth in claim 13.

18. A polymeric alpha-methacrylyl urea.

19. A polymeric alpha-methacrylyl phenylurea.

20. An interpolymer obtainable by polymerizing alpha-methacrylyl urea in the presence of methyl alpha-methacrylate.

21. In a process of producing a polymerization product from alpha-methacrylyl urea, the step which comprises heating monomeric alpha-methacrylyl urea with a polymerizable substance from the class consisting of acrylic and methacrylic acids, their amides, anhydrides, nitriles and esters; ketones containing the group $$CH_2=C-CO-$$

butadiene, chlorobutadiene and isoprene; itaconic and fumaric acids, their esters, amides and nitriles; styrene, vinyl acetate, vinyl chloroacetate, and vinyl chloride; and drying and semi-drying fatty oils.

22. An interpolymer obtained by polymerizing the product set forth in claim 12, in the presence of a polymerizable substance from the class consisting of acrylic and methacrylic acids, their amides, anhydrides, nitriles and esters; ketones containing the group $$CH_2=C-CO-$$

butadiene, chlorobutadiene and isoprene; itaconic and fumeric acids, their esters, amides and nitriles; styrene, vinyl acetate, vinyl chloroacetate, and vinyl chloride; and drying and semi-drying fatty oils.

23. An interpolymer obtainable by polymerizing alpha-methacrylyl urea in the presence of a polymerizable substance from the class consisting of acrylic and methacrylic acids, their amides, anhydrides, nitriles and esters; ketones containing the group $$CH_2=C-CO-$$

butadiene, chlorobutadiene and isoprene; itaconic and fumaric acids, their esters, amides and nitriles; styrene, vinyl acetate, vinyl chloroacetate, and vinyl chloride; and drying and semi-drying fatty oils.

RALPH A. JACOBSON.

CERTIFICATE OF CORRECTION.

Patent No. 2,090,596.     August 17, 1937.

RALPH A. JACOBSON.

It is hereby certified that error appears in the printed specification of the above numbered patent requiring correction as follows: Page 4, first column, line 33, for "alpha-phenylarcrylate" read alpha-phenylacrylate; line 38, after the word "sodium" second occurrence, strike out the comma; page 6, second column, line 36, claim 22, for "fumeric" read fumaric; and that the said Letters Patent should be read with these corrections therein that the same may conform to the record of the case in the Patent Office.

Signed and sealed this 19th day of October, A. D. 1937.

(Seal)

Henry Van Arsdale.
Acting Commissioner of Patents.

4. In the process of reacting an ester of a monomeric alpha-methylene monocarboxylic acid with an alkali metal carboxylic acid amide, the step which comprises forming the alkali metal carboxylic acid amide in situ in liquid ammonia in the presence of the alpha-methylene monocarboxylic acid ester.

5. The process of producing a monemeric alpha-methacrylyl urea which comprises reacting an ester of monomeric alpha-methyl acrylic acid with a sodium urea.

6. The process of producing an alpha-methacrylyl urea which comprises reacting an ester of monomeric alpha-methyl acrylic acid with a sodium urea in the presence of a catalyst from the class consisting of lower saturated aliphatic alcohols and ketones.

7. The process of producing an alpha-methacrylyl urea which comprises reacting an ester of monomeric alpha-methyl acrylic acid with a sodium urea in the presence of acetone.

8. The process of producing an alpha-methacrylyl urea which comprises reacting monomeric methyl alpha-methacrylate with a sodium urea in the presence of acetone.

9. In a process of producing compounds having therein the acyl radical of an alpha-methylene monocarboxylic acid, the steps which comprise reacting an ester of a monomeric alpha-methylene monocarboxylic acid with an alkali metal carboxylic acid amide, and polymerizing the resultant product.

10. In a process of producing polymerized alpha-methacrylyl urea, the step which comprises heating monomeric alpha-methacrylyl urea.

11. In a process of producing polymerized alpha-methacrylyl urea, the step which comprises heating monomeric alpha-methacrylyl urea with a small amount of benzoyl peroxide in ethyl alcohol.

12. A monomeric carboxylic acid amide in which at least one amido-hydrogen atom has been replaced by the acyl radical of an alpha-methylene monocarboxylic acid of the formula $$R-\underset{\underset{CH_2}{\|}}{C}-COOH$$

where R is hydrogen or a monovalent hydrocarbon radical.

13. A monomeric substituted urea in which at least one hydrogen atom is replaced by the acyl radical of an alpha-methylene monocarboxylic acid.

14. An alpha-methacrylyl urea.

15. An alpha-methacrylyl phenylurea.

16. Polymers obtainable by the polymerization of the products set forth in claim 12.

17. Polymers obtainable by the polymerization of the products set forth in claim 13.

18. A polymeric alpha-methacrylyl urea.

19. A polymeric alpha-methacrylyl phenylurea.

20. An interpolymer obtainable by polymerizing alpha-methacrylyl urea in the presence of methyl alpha-methacrylate.

21. In a process of producing a polymerization product from alpha-methacrylyl urea, the step which comprises heating monomeric alpha-methacrylyl urea with a polymerizable substance from the class consisting of acrylic and methacrylic acids, their amides, anhydrides, nitriles and esters; ketones containing the group $$CH_2=C-CO-$$

butadiene, chlorobutadiene and isoprene; itaconic and fumaric acids, their esters, amides and nitriles; styrene, vinyl acetate, vinyl chloroacetate, and vinyl chloride; and drying and semi-drying fatty oils.

22. An interpolymer obtained by polymerizing the product set forth in claim 12, in the presence of a polymerizable substance from the class consisting of acrylic and methacrylic acids, their amides, anhydrides, nitriles and esters; ketones containing the group $$CH_2=C-CO-$$

butadiene, chlorobutadiene and isoprene; itaconic and fumeric acids, their esters, amides and nitriles; styrene, vinyl acetate, vinyl chloroacetate, and vinyl chloride; and drying and semi-drying fatty oils.

23. An interpolymer obtainable by polymerizing alpha-methacrylyl urea in the presence of a polymerizable substance from the class consisting of acrylic and methacrylic acids, their amides, anhydrides, nitriles and esters; ketones containing the group $$CH_2=C-CO-$$

butadiene, chlorobutadiene and isoprene; itaconic and fumaric acids, their esters, amides and nitriles; styrene, vinyl acetate, vinyl chloroacetate, and vinyl chloride; and drying and semi-drying fatty oils.

RALPH A. JACOBSON.

CERTIFICATE OF CORRECTION.

Patent No. 2,090,596. August 17, 1937.

RALPH A. JACOBSON.

It is hereby certified that error appears in the printed specification of the above numbered patent requiring correction as follows: Page 4, first column, line 33, for "alpha-phenylarcrylate" read alpha-phenylacrylate; line 38, after the word "sodium" second occurrence, strike out the comma; page 6, second column, line 36, claim 22, for "fumeric" read fumaric; and that the said Letters Patent should be read with these corrections therein that the same may conform to the record of the case in the Patent Office.

Signed and sealed this 19th day of October, A. D. 1937.

Henry Van Arsdale.

(Seal) Acting Commissioner of Patents.

CERTIFICATE OF CORRECTION.

Patent No. 2,090,596. August 17, 1937.

RALPH A. JACOBSON.

It is hereby certified that error appears in the printed specification of the above numbered patent requiring correction as follows: Page 4, first column, line 33, for "alpha-phenylarcrylate" read alpha-phenylacrylate; line 38, after the word "sodium" second occurrence, strike out the comma; page 6, second column, line 36, claim 22, for "fumeric" read fumaric; and that the said Letters Patent should be read with these corrections therein that the same may conform to the record of the case in the Patent Office.

Signed and sealed this 19th day of October, A. D. 1937.

(Seal)

Henry Van Arsdale.
Acting Commissioner of Patents.